US012542018B2

(12) United States Patent
Chan et al.

(10) Patent No.: US 12,542,018 B2
(45) Date of Patent: Feb. 3, 2026

(54) AUTONOMOUS VEHICLE LOCKER UTILIZATION SYSTEMS AND METHODS

(71) Applicant: Universal City Studios LLC, Universal City, CA (US)

(72) Inventors: Eric To Chan, Kissimmee, FL (US); Robert Michael Jordan, Orlando, FL (US); Howard Bruce Mall, Jr., Winter Springs, FL (US); Mark James Traynor, Orlando, FL (US); Anthony Melo, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 116 days.

(21) Appl. No.: 18/346,577

(22) Filed: Jul. 3, 2023

(65) Prior Publication Data

US 2024/0013599 A1 Jan. 11, 2024

Related U.S. Application Data

(60) Provisional application No. 63/358,722, filed on Jul. 6, 2022.

(51) Int. Cl.
*G07C 9/00* (2020.01)
*B60R 7/02* (2006.01)
*G05D 1/00* (2024.01)

(52) U.S. Cl.
CPC ............ *G07C 9/00896* (2013.01); *B60R 7/02* (2013.01); *G05D 1/0214* (2013.01); *G07C 9/00563* (2013.01); *G07C 2009/0092* (2013.01)

(58) Field of Classification Search
CPC ............ G07C 9/00896; G07C 9/00563; G07C 2009/0092; B60R 7/02; G05D 1/0214;
(Continued)

(56) References Cited

U.S. PATENT DOCUMENTS 10,216,188 B2 * 2/2019 Brady ................ G06Q 10/0837
10,719,805 B2 * 7/2020 Ferguson ........... G01C 21/3453
(Continued)

FOREIGN PATENT DOCUMENTS

| CN | 213365558 U | 6/2021 |
|---|---|---|
| WO | 2018217661 A1 | 11/2018 |
| WO | 2020168896 A1 | 8/2020 |

OTHER PUBLICATIONS

PCT/US2023/026947 International Search Report and Written Opinion mailed Oct. 23, 2023.

*Primary Examiner* — Aniss Chad
*Assistant Examiner* — Nikki Marie M Molina
(74) *Attorney, Agent, or Firm* — Fletcher Yoder P.C.

(57) ABSTRACT

An autonomous vehicle locker system includes a controller configured to associate an autonomous vehicle locker with a guest at a first location, receive an indication that guest items are within a storage compartment, secure the storage compartment based on the indication, instruct the autonomous vehicle locker to travel to a second location, identify the guest from guests at the second location, and instruct the autonomous vehicle locker to unlock the storage compartment in response to identifying the guest. Specifically, embodiments of the present disclosure present a solution to provide guests with a convenient way to store, transport and/or receive personal guest items and/or purchased items.

20 Claims, 8 Drawing Sheets

(58) Field of Classification Search
CPC ............. G05D 1/6987; G05D 2105/28; G05D 2107/87; G05D 2109/10; A47G 29/141
See application file for complete search history.

(56) References Cited

U.S. PATENT DOCUMENTS

| | | | |
|---|---|---|---|
| 10,957,135 B2* | 3/2021 | McGehee | G07C 9/00309 |
| 11,200,979 B2 | 12/2021 | Davey et al. | |
| 11,360,471 B1* | 6/2022 | Kalama | H04N 23/57 |
| 2019/0047515 A1* | 2/2019 | Ferguson | G06Q 20/18 |
| 2019/0073631 A1 | 3/2019 | Ferguson et al. | |
| 2019/0079521 A1 | 3/2019 | Blum et al. | |
| 2019/0201768 A1* | 7/2019 | Yeh | H04L 67/306 |
| 2019/0318159 A1* | 10/2019 | Blanc-Paques | G06Q 10/02 |
| 2021/0256472 A1* | 8/2021 | Javidan | G06Q 10/0833 |
| 2022/0080879 A1* | 3/2022 | Moon | B60Q 1/2603 |

\* cited by examiner

AUTONOMOUS VEHICLE LOCKER UTILIZATION SYSTEMS AND METHODS

CROSS-REFERENCE TO RELATED APPLICATIONS

The present application claims priority to and the benefit of U.S. Provisional Application No. 63/358,722, filed on Jul. 6, 2022, entitled "AUTONOMOUS VEHICLE LOCKER UTILIZATION SYSTEMS AND METHODS", the disclosure of which is incorporated by reference in its entirety herein.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks or similar entertainment facilities often include one or more locker systems, such that users (e.g., guests and personnel) may store their belongings in the lockers while at the amusement park. However, it may be time-consuming to find or register for an available locker among a large number of lockers. It may also be burdensome to unlock/lock a locker while attending to other needs (e.g., carrying things, enjoying the amusement park). In addition, it may be challenging to efficiently provide suitable lockers to a large number of users seeking lockers at the same time. Accordingly, it would be desirable to provide efficient systems and methods for providing users with lockers in the amusement park.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an autonomous vehicle locker comprises a controller comprising a memory storing instructions and a processor configured to execute the instructions. The instructions are configured to cause the controller to associate an autonomous vehicle locker with a guest at a first location, receive an indication that guest items are within a storage compartment, secure the storage compartment based on the indication, instruct the autonomous vehicle locker to travel to a second location, identify the guest from a plurality of guests at the second location, and instruct the autonomous vehicle locker to unlock the storage compartment in response to identifying the guest.

In an embodiment, an autonomous vehicle locker comprises a controller comprising a memory storing instructions and a processor configured to execute the instructions. The instructions are configured to cause the controller to receive an indication of association of an autonomous vehicle locker with a guest, cause the autonomous vehicle locker to travel to a holding area after receiving guest items, track a guest location, receive a request to receive the guest items from the autonomous vehicle locker, cause the autonomous vehicle locker to travel to the tracked guest location based on the request, and unlock a storage compartment in response to identifying the guest at the guest location.

In an embodiment, an autonomous vehicle locker method includes associating an autonomous vehicle locker with a guest, acquiring an image of the guest with a camera of the autonomous vehicle locker, receiving guest items in a storage compartment of the autonomous vehicle locker, receiving data from other autonomous vehicle lockers, locating the guest based on the data from the other autonomous vehicle lockers, instructing the autonomous vehicle locker to travel to a location of the guest based on the locating, acquiring an updated image at the location, identifying the guest in the updated image, and unlocking the storage compartment in response to identifying the guest.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
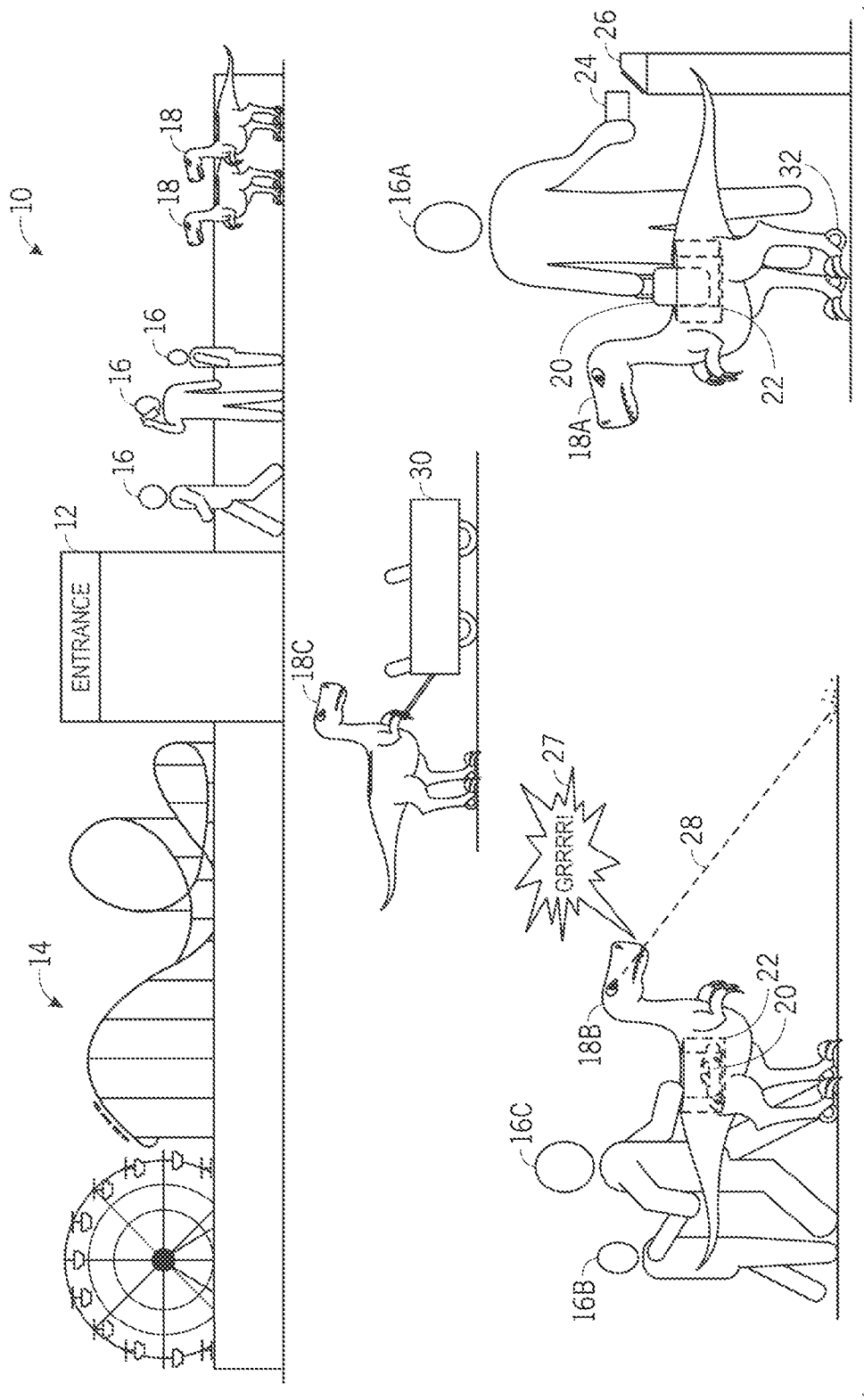
FIG. 1 is a schematic illustration of autonomous vehicle lockers, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure relates to systems and methods for utilizing an autonomous vehicle locker for storage, transportation, and delivery of various items in an amusement park environment. Specifically, embodiments of the present disclosure present a solution to provide users with convenient access to lockers for storage of guest items, convenient transportation of items, and/or delivery of purchased items. For example, for certain amusement attractions, guests are required to stow bags and mobile phones in lockers. In certain cases, guest lockers are located near an entrance to an amusement attraction, and guests have to backtrack to a locker room after the amusement attraction is over to retrieve their belongings. The locker room may be crowded, and the retrieval process may not be orderly. In other examples, guests may find it inconvenient to park and retrieve strollers and/or wheelchairs from designated sites. In addition, during the time at the amusement park, guests may acquire certain items, such as prizes, souvenirs, toys, food etc., and guests may have to carry the acquired items with them throughout their visit to the amusement park. Carrying and keeping track of multiple acquired items may result in the guests forgetting or losing the acquired items while at the amusement park.

Accordingly, the present disclosure provides autonomous vehicle lockers that can autonomously travel to a guest location. In an embodiment, the autonomous vehicle locker may store and drop off guest items in any location convenient to the guest, eliminating or reducing the need for the guest to go to a dedicated locker area (e.g., dedicated locker room). In an embodiment, the autonomous vehicle locker may accompany a guest throughout the guest's visit to amusement park, transporting the items acquired by the guest, eliminating the need for the guest to carry and keep track of the acquired items. In an embodiment, autonomous vehicle lockers can acquire and deliver food or retail items and store these items until needed by the guest. Autonomous vehicle lockers may transport strollers and wheelchairs to a designated parking location for the duration of the amusement ride and bring them back to the guests after the ride. In embodiments, the autonomous vehicle lockers may navigate to the guest or be locked and/or unlocked using guest biometrics, eliminating the need for guest tracking using location information from a guest mobile device, which may be stowed in the locker compartment and inaccessible.

With the foregoing in mind, to demonstrate various aspects of the present disclosure, the present embodiments are described with respect to an autonomous vehicle locker that stores, transports, and/or delivers items for guests in an amusement park, entertainment facility, or any other suitable facility. Specifically, embodiments of the present disclosure present a solution to provide guests with a convenient way to store, transport and/or receive personal guest items and/or purchased items. In embodiments, the autonomous vehicle lockers may navigate to the guest or be locked and/or unlocked using guest biometrics, eliminating the need for guest tracking using location information from a guest mobile device, which may be stowed in the locker compartment and inaccessible.

For example, FIG. 1 is a schematic illustration of an amusement park environment 10. In the illustrated example, an entrance 12 of an amusement attraction 14 (e.g., amusement ride, immersive experience, show experience) may be arranged such that guests 16 may interact with autonomous vehicle lockers 18, in accordance with an aspect of the present disclosure. In the illustrated example, guests 16 queue at an entrance 12 of the amusement attraction 14. In the depicted embodiment, the autonomous vehicle lockers 18 (also referred to herein as "lockers") may be used by the guests 16 to store any personal guest items while attending/riding the amusement attraction 14. For example, in FIG. 3, guest 16A is in the process of storing a guest item 20 (e.g., a purse) in the autonomous vehicle locker 18A before queueing to enter the amusement attraction 14. The autonomous vehicle locker 18A may have a securable storage compartment 22 (e.g., a chamber) where the guest item 20 may be stowed. Guests 16B and 16C are in the process of retrieving a guest item 20 (e.g., a toy) from the storage compartment 22 of autonomous vehicle locker 18B. In addition to stowing guest items 20, autonomous vehicle locker 18 may also manage personal transportation/mobility equipment 30 (e.g., strollers, wheelchairs, carts, mobility scooters) of guests 16 for the duration of the amusement attraction 14. For example, locker 18C is transporting a personal transportation equipment 30 (e.g., a cart) to its temporary parking spot while the guest(s) 16 to whom the cart belongs to are attending/riding the amusement attraction 14.

In the embodiment, a guest pass 24 (e.g., a paper guest pass, an electronic guest pass) may be used to summon a locker 18 before and after an amusement attraction 14 to store and/or retrieve guest items 20. For example, in the illustrated embodiment, a guest 16A summons a locker 18A by scanning a guest pass 24 (e.g., a physical or paper ticket or a pass stored on and, in embodiments, displayed on a mobile device or other computer) via a pass scanner 26. The guest pass 24 may include a QR code or other readable code, and the pass scanner 26 may include an optical reader. However, other techniques are also contemplated. In an embodiment, the guest pass may provide identifying information via an RFID tag that is read by the pass scanner 26 (e.g., RFID reader (e.g., RFID tag reader)). Scanning the guest pass 24 via a pass scanner 26 may send a wireless signal to the locker 18A conveying the location of the guest 16A. After leaving the amusement attraction 14, guest 16A may scan the guest pass 24 with another pass scanner 26 located at the exit of the amusement attraction to summon the locker 18A to retrieve guest item 20. In an embodiment, a guest pass 24 may be an electronic pass viewable via an application on a mobile device. In an embodiment, summoning a locker 18 to deposit and/or retrieve items before and/or after attending an amusement attraction 14 may be a premium guest experience. In this case, the guest pass 24 used to summon a locker 18 may be a premium pass and only guests 16 with premium guest passes 24 may use autonomous guest lockers 18.

To ensure the security of guest items 20 stored in autonomous vehicle lockers 18, when a guest 16 is using a locker 18 to store guest item 20, the locker 18 may be associated with (e.g., linked to, assigned to) only the guest 16 at least while the guest item 20 of the guest 16 is stored in the locker 18. Thus, guests 16 may have exclusive access to lockers 18 assigned to them. For example, guests 16B-C may not use locker 18A because locker 18A is assigned to guest 16A. In an embodiment, a locker 18 may be assigned to a guest 16 for duration of the guest's visit to the amusement park. In this case, the guest 16 may summon the locker 18 multiple times during the amusement park visit. In an embodiment, a locker 18 may be assigned to a group of guests 16. In an embodiment, the locker 18, once assigned to the guest 16 and after receiving guest items, may autonomously travel to a holding area or maintenance bay to remain generally out of guest traffic until summoned or until receiving an indication that a guest experience, such as a ride, is complete.

A locker 18 that is assigned to a guest 16 may be unlocked by the guest 16 using various techniques. For example, a locker 18 may include a biometric sensor (e.g., camera, fingerprint scanner, retinal scanner, iris scanner) that may scan, record and/or capture one or more biometric characteristics (e.g., fingerprint, facial features, retina pattern, iris pattern) of the guest 16. The biometric characteristics of the guest 16 assigned to the locker 18 may be used to verify the identity of the guest 16 and to unlock the locker 18. The assigned locker 18 may record the biometric characteristics of the guest 16 to be used as reference during the locker assignment process. For example, the guest 16 may scan a fingerprint via the biometric sensor to lock the storage compartment 22 and to unlock the storage compartment 22 of the locker 18. Alternatively, the assigned locker 18 may obtain guest's biometric characteristics from a guest profile (e.g., online profile, registration profile) of the guest 16. For example, the biometric characteristics of the guest 16 may be saved in the guest profile from the guest's prior visit to the amusement park. In an embodiment, biometric information may be provided via an application operating on the guest mobile device that provides a guest interface, and the biometric sensors may be sensors resident on the mobile device. Biometric identification may be advantageous for cases in which the guest 16 surrenders all personal items to the locker 18, e.g., during a roller coaster ride in which loose items are prohibited. Thus, the guest 16 may not retain a mobile device or paper ticket to mediate guest identification by the system.

In an embodiment, lockers 18 may use RFID technology to verify identities of guests 16. For example, a guest 16 may wear an RFID wearable device (e.g., armband, bracelet, watch, another wearable device) in the amusement park that allows the guest 16 to pay for purchases and/or enter amusement attractions in the park. Such RFID device may be used to lock and unlock the assigned locker 18 of the guest 16. In particular, the RFID armband may contain an RFID tag and a locker 18 may contain an RFID sensor (e.g., RFID reader, RFID tag reader). The guest 16 may scan the RFID tag on the armband to unlock the locker 18. In an embodiment, a guest 16 may carry a key fob (e.g., RFID-enabled key fob) for unlocking/locking the assigned locker 18, or the unlocking of the locker 18 may be mediated by wireless communication between the locker 18 and a guest mobile device.

Generally, a variety of techniques may be employed to arrange a meeting between a guest 16 and an assigned locker 18 (e.g., after the assigned locker 18 has been summoned by the guest 16 or when a guest 16 otherwise associates with a locker 18). That is, the locker 18 may travel to or navigate to the guest 16 after the locker 18 is triggered by a locker assignment event of the system and/or triggered by a guest request for the locker 18 or by the attraction completion. In one embodiment, locker assignment to the guest may be based on availability or proximity, e.g., the guest 16 selects an available locker 18. In an example, the closest available locker 18 of a fleet may travel to the guest 16. In an example, the available lockers 18 may activate an availability signal, such as an audio and/or visual signal. In one example, a locker 18 may have a displayed "name" or call sign, and the guest 16 may shout the name to call the locker 18 to them. The guest audio may be sensed by an on-board sensor of the locker 18 and matched to the characteristic audio data associated with the name. A verified match causes the locker 18 to navigate to the associated guest 16. In an embodiment, any lockers 18 that are in an area and stationary may be considered available lockers 18. In contrast, assigned lockers 18, after receiving guest items, may be instructed to travel to a separate area not accessible by guests until a guest request for their items is received.

Navigation of assigned lockers 18 to provide secured contents to the guest 16 may be accomplished using location tracking. In an embodiment, the locker 18 may use remote tracking of the guest 16 to arrive at a location of the guest 16 (e.g., after the guest 16 has attended the amusement attraction 14). For example, a key fob, which may be used by the guest 16 for opening/unlocking the locker 18, may be augmented to include a tracking device that communicates to the locker 18 the location (e.g., global positioning system (GPS) location) of the guest 16. When the tracking device indicates that the guest 16 is at the exit of the amusement attraction 14, the locker 18 may approach the exit of the amusement attraction 14 to meet/reunite with the guest 16. It may be appreciated that the tracking technology (e.g., technology for tracking the location of the guest 16 (e.g., GPS technology)) may be embedded in wearable devices such as armbands. In addition, the mobile device of guests 16 may be used to provide the locations of guests 16 to associated lockers 18 respectively. That is, the location of the mobile device may be associated with GPS data and/or wireless communication data that is associated with a particular location.

In an embodiment, increasingly sensitive (e.g., more location-precise) sensors may be used by lockers 18 to arrive at the precise location of the associated guests 16 in the amusement park. For example, global positioning system (GPS) information from a tracker (e.g., in an arm band or a key fob) may provide an approximate location of the guest 16 while more precise location information may be estimated using facial recognition and data from light detection and ranging (LIDAR) sensors or image sensors within the amusement park. However, when approaching the guest 16, a locker 18 may not come closer than a threshold distance to the exact location of the guest 16, to make sure the locker 18 does not come too close.

In an embodiment, the locker 18 may track and find the guest 16 in the amusement park using a mesh network of multiple lockers 18 that communicate with one another, either directly or via a central controller 56 (see FIG. 4) and that acquire and transmit biometric data using the network. For example, when guest 16 stows a guest item in a locker 18 for the duration of an amusement attraction 14, the locker 18 may take a photo of the guest 16 using a camera located on the locker 18. Guest facial capture by the camera may be mediated by a user interface of the locker 18, which can provide instructions to permit initial image capture of the assigned guest 16 by an on-board camera of the locker 18. The captured image and an indication of the associated locker 18 can be provided to the central controller to temporarily associate the guest 16 with an individual locker 18. Local cameras, which may at least in part be on-board each locker 18 for the amusement attraction 14 (e.g., all the lockers 18 dedicated for the amusement attraction 14), may capture images of all of the guests 16 entering the amusement attraction 14 and provide the images to a central controller. Thus, the pool of images of potential guests 16 taken from the population entering the attraction 14 is relatively small, permitting fast and less computationally intensive facial recognition or matching processes.

The assigned locker fleet can be directed to the exit of the amusement attraction 14 to wait for exiting guests 16. The movement to the exit may trigger an exit protocol in which the on-board cameras are activated to capture images of guests 16 in camera range that can be used to identify not only the guest 16 assigned to that locker 18, but to send images to the central controller that can be used to map locations of the potential guests 16 in the exit area and direct their assigned lockers 18 to them. The locker 18 may find the associated guest 16 through edge computing using the pool of images of potential guests 16. For example, each locker 18 in the fleet can capture an image of an exiting guest 16 in a locker camera field of view and send the image to the central controller. If the guest 16 is associated with that particular locker 18, the locker 18 can initiate item access for the guest 16. If the guest 16 is not associated with the locker 18, the central controller can identify if the captured exiting guest 16 is assigned to a different locker 18 using the pool of images taken at attraction entrance and provide the captured exiting guest location, e.g., relative to the locker 18 that captured the image, to that guest's assigned locker 18.

If this is performed by all lockers 18 in the fleet, (e.g., edge computing in a mesh network of lockers 18) the lockers 18 can efficiently find their associated guests 16 out of a pool of potentially hundreds of guests 16 and avoids using complex face recognition algorithms. Each locker 18 in the mesh network (either via direct communication or mediated through the central controller) may update all lockers 18 in the mesh network as potential guest matches are eliminated. For example, as guests 16 are exiting the amusement attraction 14, a locker 18 may capture an image of a guest 16, determine that the guest 16 does not match the guest 16 associated with it, but send the image and guest location information for the nonmatching guest 16 to the other lockers 18 in the mesh network. A matching locker 18 (e.g., locker 18 that is associated with the guest 16) in the fleet may identify the guest 16 using the image and track the guest 16 using the location information sent. In an additional or an alternative embodiment, lockers 18 may find their associated guests 16 using a facial recognition algorithm (e.g., a machine learning algorithm that performs facial recognition). For example, each locker 18 may use facial recognition algorithm to identify guests 16 in proximity to the locker 18 (e.g., based on an initially captured photo of the guest 16 or on a photo associated with a guest profile) and share the identities of the recognized guests 16 and locations of the recognized guests 16 with other lockers 18 in the mesh network. Then, each locker 18 may track the associated guest 16 using the facial recognition data and location data available on the mesh network.

Alternatively, a locker 18 may simply approach each guest 16 one after another and perform facial recognition on each guest 16 until the locker identifies the assigned guest 16. In this manner, guest recognition and navigation of an assigned locker 18 to the associated guest 16 can be performed in a phone-free or device-free manner, which may be beneficial if the guest's mobile device is stowed in the locker 18. That is, rather than summoning or hailing the locker 18, the locker 18 travels to the guest 16 in a manner similar to friends greeting one another or, for certain narrative environments, in a manner similar to a predator stalking prey.

In one embodiment, a guest 16 may be able to customize the appearance of their assigned locker 18 enabling the guest 16 to recognize their locker 18 in the vicinity. This may enable the guest 16 to approach the locker 18 to deposit and/or retrieve their items, without waiting for the locker 18 to arrive at the location of the guest 16. This approach may be used in crowded places or in other locations where the locker 18 may experience delays in reaching the guest 16. In an embodiment, the guest 16 may name the locker 18 and may shout the name to permit sensing by an on-board sensor of the locker 18 of their assigned guest 16 speaking the name. The locker 18 may use acoustic sensors to travel towards the recognized sound or phrase.

In an embodiment, a locker 18 may be customized to display preferred colors, emit preferred sounds, and/or lights of a guest 16. In addition, the locker 18 may display gestures or perform certain actions when the guest 16 is in the vicinity of the locker 18. For example, the locker 18 may light up, make sounds, and/or change the output of its display. An example of this is illustrated in FIG. 1, where locker 18B emits a sound 27 and emits lasers 28 from its eyes to draw attention of the guests 16B and 16C, whose guest item 20 is in the locker 18B.

In an embodiment, features of the lockers 18 (e.g., audio features such as emission of sound 27 and/or activation of lasers 28) may be selected and/or customized by the guests 16 when the lockers 18 are assigned to the guests 16. For example, a mobile application may be used by the guest 16 to select and/or customize features (e.g., one or more features of the lockers 18 (e.g., one or more outputs of the lockers 18 (e.g., colors, sounds, lights, actions, gestures)). Alternatively, a locker 18 may include a user interface that may be used by the guests 16 to select and/or customize features of the locker 18. In an embodiment, selected and/or customized features (e.g., custom features) of the locker 18 may be added to and/or saved in the guest profile of the guest 16. In an embodiment, the assigned locker 18 may output (e.g., display or perform) selected and/or a customized feature configuration associated with the profile of the assigned guest 16. The guest profile may enable the assigned locker 18 to exhibit selected and/or customized features selected by the guest 16 during prior visits to the amusement park. Further, certain displayed, visible, and/or audible features may be used to indicate if the locker 18 is occupied or is available. In certain embodiments, the locker 18 may have one feature set associated with unrecognized guests 16 and a different feature set upon recognition of their assigned guest 16. For example, glowing red eyes may be activated when guests 16 not associated with the locker 18 are captured by the locker camera while glowing green eyes are indicative of recognition of the assigned guest 16.

The custom features of the lockers 18 may enable guests 16 to identify and find their assigned lockers 18 in the amusement park. In an embodiment, finding an assigned locker 18 in the amusement park may be an interactive quest for the guest 16. For example, the guest 16 may be provided with clues and/or a map that may be used by the guest 16 to find the locker 18. In an embodiment, the clues and/or the map may be provided to the guest 16 through an application on a mobile device. Upon finding the assigned locker 18, the guest 16 may unlock the locker 18 to find a prize inside. Points and/or a score may be assigned to the guest 16 for successfully finding the locker 18. The points and/or the score may be added to the guest profile of the guest 16. The number of points and/or the score may depend on the time it took the guest 16 to find the locker 18 and/or on the difficulty level of the clues provided. Additionally or alternatively, the guest 16 may unlock special features of a locker 18 by completing the quest to find the locker 18. The special features may include exclusive custom features of the locker 18, special prizes, tickets, etc. For example, the guests 16 who find their lockers 18 in under five minutes may customize their locker 18 to glow in the dark, a feature not available to other guests 16.

Figure 2A:
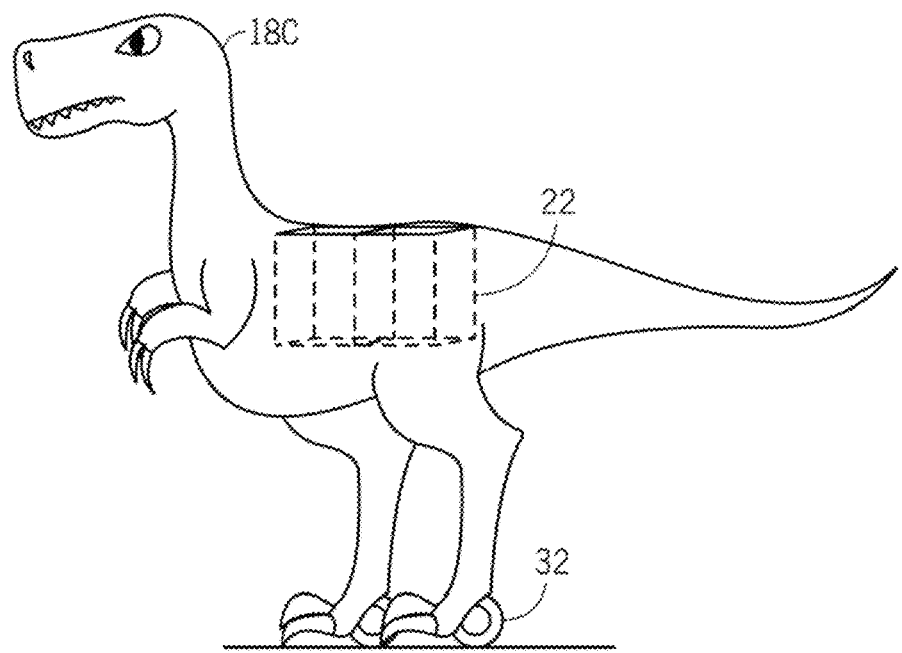
FIG. 2A is a perspective view an autonomous vehicle locker embodied as a dinosaur, in accordance with an aspect of the present disclosure.
Figure 2B:
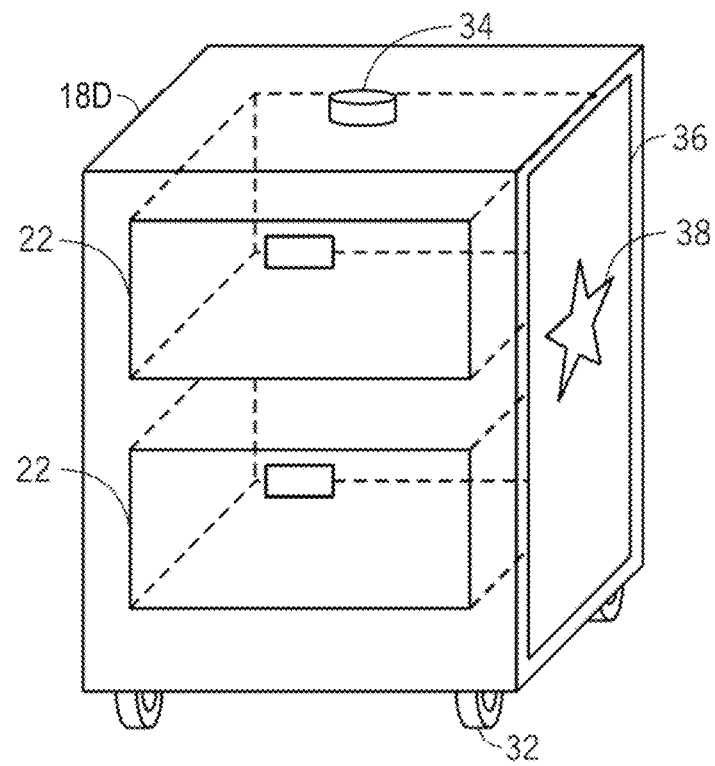
FIG. 2B is a perspective view of the autonomous vehicle locker embodied as a beverage cart, in accordance with an aspect of the present disclosure.

Autonomous vehicle lockers 18 may have different appearances and/or designs depending on the theme of the park and the constraints placed on the lockers 18 by their intended operation. In one embodiment, an autonomous vehicle locker 18 may have an unexpected appearance in order to surprise and/or amuse guests 16. For example, the locker 18 may be configured to generally resemble a dinosaur as shown in FIG. 2A, in accordance with an aspect of the present disclosure. In one embodiment, a locker 18 may be designed to maximize the capacity of its storage compartments 22. In this case, the locker 18 may look like a beverage cart as shown in FIG. 2B. The FIG. 2B is a schematic diagram of an autonomous vehicle locker 18D embodied as a beverage cart, in accordance with an aspect of the present disclosure. In embodiments, one or more storage compartments 22 may be refrigerated compartments or heated compartments suitable for food storage.

The locker 18 may include one or more storage compartments 22 where guest items 20 of guests 16 may be stored. For locomotion, the locker 18 may include wheels 32 that operate under motor and/or engine control. Alternatively, locker 18 may include actuators and joints allowing robotic actuation. The locker 18 may include various sensors (e.g. for authenticating guest identities, sensing obstacles, detecting guest items 20 in the storage compartment 22) and/or wireless communication circuitry (e.g., for tracking assigned guests 16). The locker 18 may include different color lights, lasers, and LEDs for displaying custom features. In addition, locker 18D may include one or more speakers and one or more display(s) 36 for displaying images 38 corresponding to custom features and/or thematic features. The locker 18 may include additional robotic components that may allow it to move in a realistic manner. For example, the locker 18 may have a soft robotic tail and/or neck allowing it to move its tail and/or turn its head.

Autonomous vehicle lockers 18 may be used for transportation and/or delivery of purchased items and/or food and/or drink in addition to storage of guest items 20. To enable such multiple uses, in an embodiment, lockers 18 may have multiple storage compartments 22. For example, the locker 18, shown in FIG. 2B, has two large storage compartments 22. For example, one storage compartment 22 may be designated for storage of guest items 20 and the other storage compartment 22 may be designated for transportation and/or delivery of purchased items and/or food and/or drink. One or both storage compartments 22 may be temperature controlled. For example, storage compartment 22 may be heated or refrigerated to maintain the proper temperature of the delivered food and/or drink.

In an embodiment, the storage compartments 22 of the locker 18 may be dual-side storage compartments 22 such that one side of the storage compartment 22 is for loading items (e.g., by retail) and another side is for unloading items (e.g., by the guest 16). For example, the dual side storage compartment 22 may have two doors, one on each side. One door can be opened by the retail staff for loading food or items purchased by the guest 16 and the other door can be opened by the guest 16 to retrieve the purchased food or items. This may permit the retail staff and the guests 16 to use different methods (e.g., keys) to access the storage compartment 22. For example, the retail side may be opened by a key, while the guest side may be unlocked by a biometric reading.

In an embodiment, the storage compartments 22 of a locker 18 may include standardized (e.g., having a standard size and shape) modules that may be taken out of the locker 18 and placed in or added to other lockers 18. Thus, the standardized modules can be swapped between different lockers 18. The standardized modules may decrease the level of human oversight needed for loading the locker 18. For example, the standardized modules may enable items purchased for delivery to be robotically loaded into the locker 18 via the standardized module. In addition, standardized modules make it feasible to store guest items 20 in a storage area (e.g., locker room, stockroom) allowing the locker 18 to perform other tasks while waiting for the items to be ready to be picked up by the guest 16. For example, instead of storing the guest items 20 in its storage compartment 22 for the duration of an amusement attraction 14, a locker 18 may take the guest items 20 to a designated storage area. After dropping off the guest items 20, the locker 18 may perform other tasks like receiving guest items 20 of another guest 16 and taking them to the storage area. After the locker 18 receives a signal indicating that the guest 16 is exiting the amusement attraction 14, the locker 18 may retrieve the standardized module with the guest items 20 from the storage area and bring the guest items 20 in the standardized module back to the guest 16. In fact, because the standardized modules may be interchangeable, a different locker 18 may bring the guest items 20 back to the guest 16. This may be advantageous, because fewer lockers 18 will be needed to service an amusement attraction 14. In addition, storing guest items 20 in a storage area may be more secure than storing guest items 20 inside a locker 18. Similarly, standardized modules can be used to enhance delivery of food and/or drink using locker 18. For example, instead of unlocking a storage compartment 22 in a locker 18, the retail staff may load the standardized module with a food item into the storage compartment 22. In an embodiment, some lockers 18 of the locker fleet may act as delivery go-betweens, delivering standardized modules with items from retail to other locker 18, which are associated with guests 16.

Figure 3:
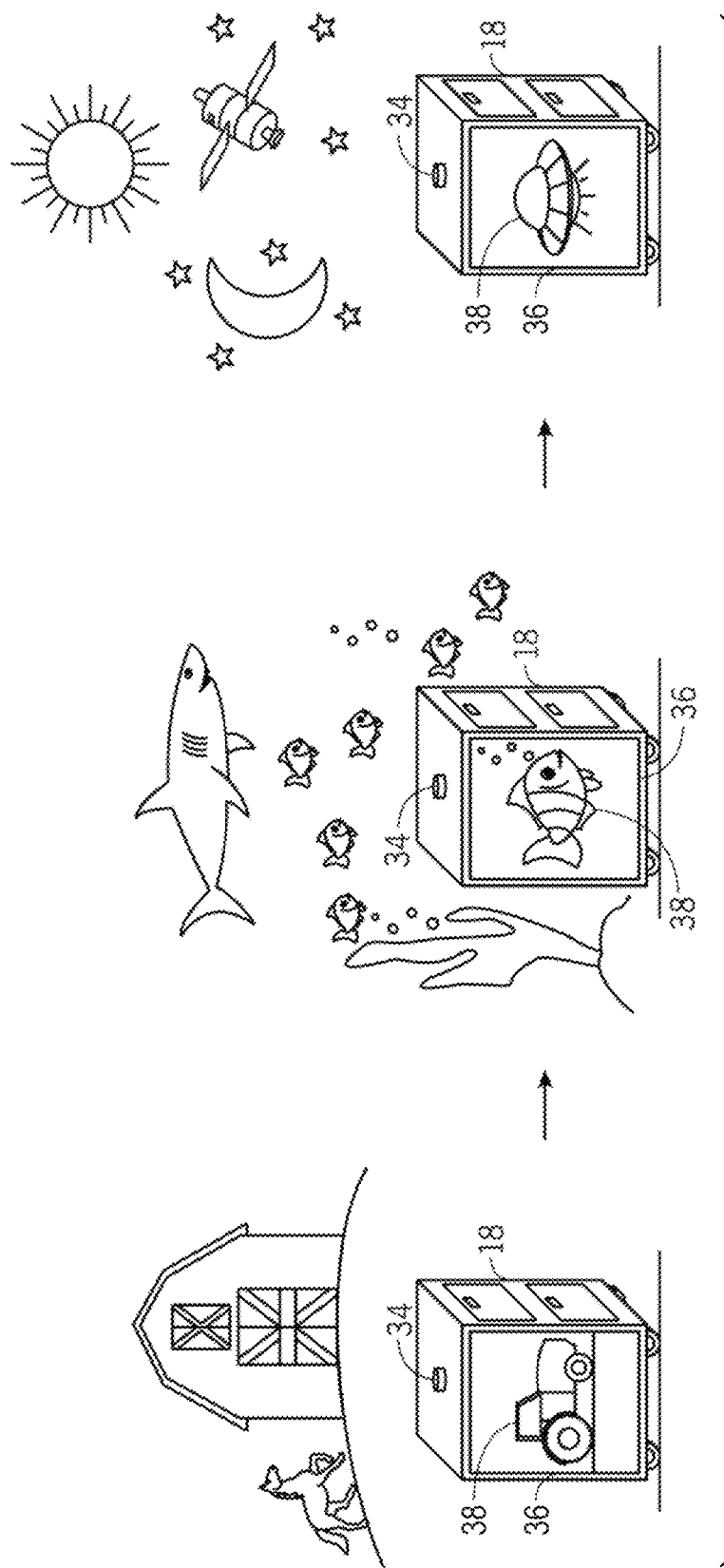
FIG. 3 is a schematic illustration of the autonomous vehicle locker with adaptive location-based theming, in accordance with an aspect of the present disclosure.

Different areas of the amusement park may have different themes. Lockers 18 that may be involved in delivery and transportation of items throughout the amusement park may travel between areas of the amusement park with different themes. It may be desirable for the lockers 18 to adapt to the various themes as they travel between the different areas of the amusement park to enhance the coherence/consistency of the themes. To this end, lockers 18 may perform adaptive theming. FIG. 3 shows an example of a locker 18 adapting to various themes in a location-dependent manner. In the illustrated example, when the autonomous vehicle locker 18 is in a farm-themed amusement park environment, coordinated theming (e.g., farm theming) of the locker 18 can be activated. As the locker 18 travels between other environments, e.g., an under-the-sea-themed amusement park environment, and/or a space-themed amusement park environment, in accordance with aspects of the present disclosure, the locker 18 may transition to the appropriate theming. It should be understood that the displayed environments and adaptive theming are by way of example.

Lockers 18 may utilize various techniques to adapt to various themes. In an embodiment, the lockers 18 may use displays 36 positioned on the sides of the locker 18 to display images 38 (e.g., animations, pictures, special effects) associated with a current theme. For example, in a farm-themed amusement park environment the locker 18 may show a tractor, in an under-the-sea-themed amusement park environment the locker 18 may show a fish, and in a space-themed amusement park environment the locker 18 may show a flying saucer, as illustrated. In an embodiment, the images 38 may not be shown on displays 36. Instead, lockers 18 display electronic ink graphics on the surface(s) of the lockers 18. In an embodiment, the locker 18 may include soft robotics that may adaptively transform the appearance of the locker 18 depending on the amusement park theme in the location of the locker 18. In an embodiment, a locker 18 may output audio (e.g., through speakers (e.g., onboard speakers, offboard speakers within a threshold distance of the locker)) associated with a current theme. For example, the audio could be sound effects, speech (e.g., speech from a particular character), and/or music associated with the current theme.

The transition between different adaptive theming may be based on the location of the locker 18 during its autonomous path. For example, if the locker 18 is summoned to travel from a first location having a first theme to a second location having a second, different theme, the system can track the location of the locker 18, e.g., via GPS or wireless communication in the environment. Detection of crossing a predetermined boundary between the first location and the second location can trigger display changes or activation of particular adaptive theming.

Figure 4:
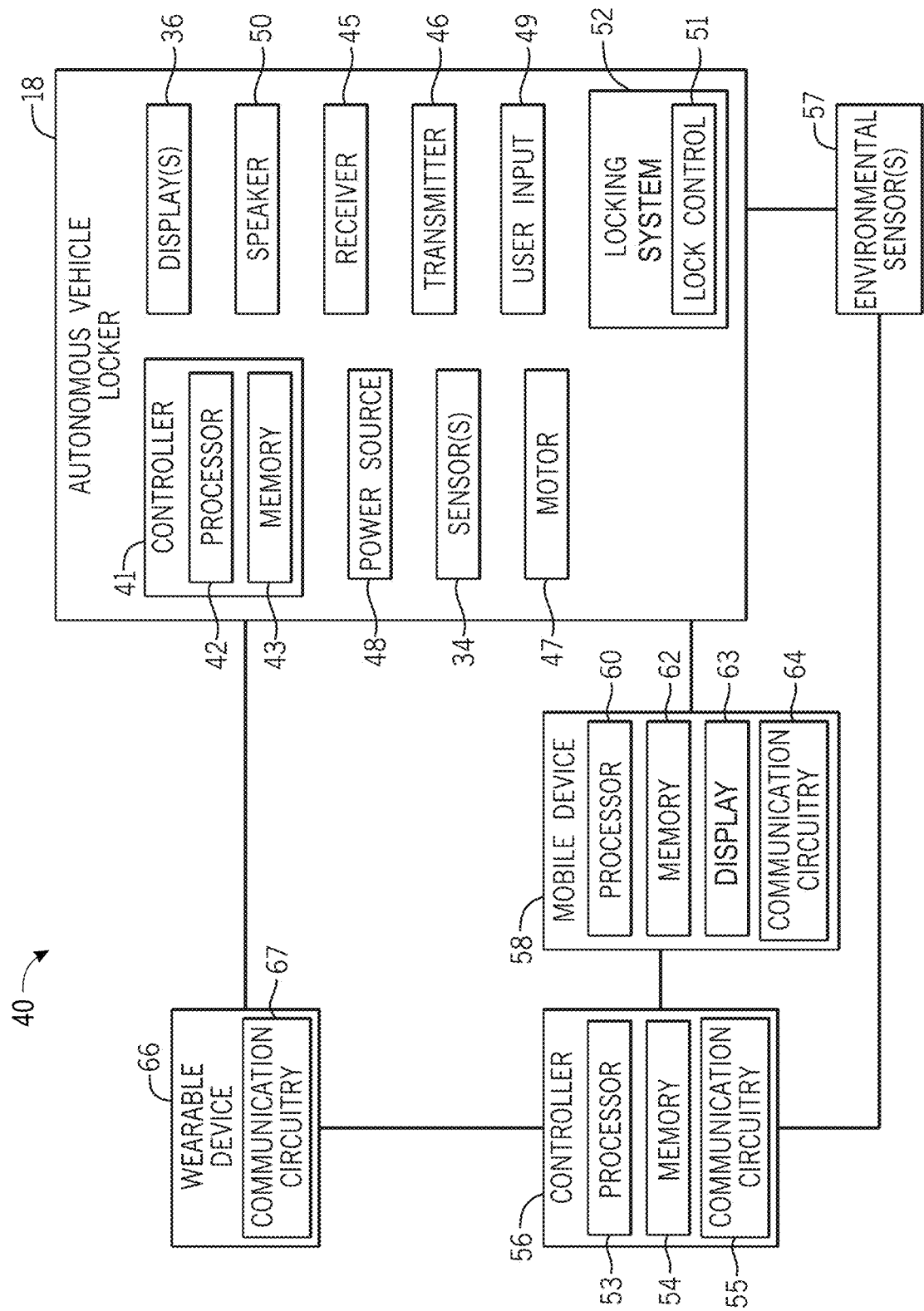
FIG. 4 is a block diagram of certain components of the autonomous vehicle locker system, in accordance with an aspect of the present disclosure.

FIG. 4 is a block diagram of certain components of an autonomous vehicle locker system 40, in accordance with an aspect of the present disclosure. It should be understood that the illustrated components may have additional software or hardware elements. Further, the functionality of various disclosed hardware or software elements may be duplicated and/or exchanged in the illustrated components of the system 10. For example, certain components of the autonomous vehicle locker 18 may additionally be present in the central controller 56, the mobile device, the environmental sensor(s), and the accompanying description of these components may be applied.

An autonomous vehicle locker 18 may be configured to operate at least in part via instructions from a controller 41, which may include a memory 43 for storing instructions executable by a processor 42 to perform the methods and control actions described herein. The processor 42 may include one or more processing devices, and the memory 43 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 42 or by a special purpose or programmed computer or other machine with a processor. In addition, the controller 41 may be configured to include communication circuitry, such as a receiver 45 and a transmitter 46 or other communications devices to communicate over wired and wireless communication paths with other lockers 18 and guest devices (e.g., guest smartphones, smart watches, armbands).

The autonomous vehicle locker 18 may include a motor 47 and a power source 48 (e.g., a battery, a solar panel, an electrical generator, a gas engine, a capacitor, or any combination thereof). In an embodiment, the autonomous vehicle locker 18 may include a rechargeable battery. In one example, the autonomous vehicle locker 18 may automatically return to a charging station when not in use to charge (e.g., via wireless charging). In an embodiment, the autonomous vehicle locker 18 may operate using wireless power transmission. The operations of the motor 47 may be controlled by a controller 41 including a memory 43 and a processor 42 and configured to operate any on-board logic to control locker paths or progress. For example, the controller 41 may control (e.g., instruct) the motor 47 to adjust its output power to accelerate (e.g., increase speed of (e.g., speed up), decrease speed of (e.g., slow down)) the locker 18. The controller 41 may also control a brake to decelerate (e.g., decrease speed of, slow down) or stop the locker 18.

The controller 41 may include on-board navigation logic that at least in part controls autonomous navigation of the autonomous vehicle locker 18. In certain cases, the system 40 may generate navigation instructions via a central controller 56. The instructions may include destination instructions. However, the autonomous vehicle locker 18 may, using on-board navigation logic, receive the navigation instructions and determine a best path to the destination based on information from sensor(s) 34. Accordingly, the autonomous vehicle locker 18 may generate on-board navigation instructions. Location information of the autonomous vehicle locker 18 used as inputs to generate the navigation instructions may be tracked using one or more of GPS, wireless communication, on-board sensor data, or environmental sensor data.

The autonomous vehicle locker 18 may include sensors 34 (e.g., biometric sensor, light detection and ranging (LIDAR) sensor, light and/or motion sensor, weight scale, cameras, laser scanners, and/or ultrasonic scanners). A biometric sensor, camera, and/or RFID sensor may be used by the locker 18 for recognition of the associated guest 16 and authentication of identity of the guest 16. In addition, sensors such as cameras, laser scanners, and/or ultrasonic scanners may be used to navigate and avoid obstacles when the locker 18 is moving. For example, if a LIDAR or a camera detects an obstacle in the path of the locker 18, the controller 41 will send a signal to the motor 47 and/or the brakes to stop movement of the locker 18. A light/motion sensor and/or a weight scale may be used to determine whether any guest items 20 remain in the storage compartment 22 after the guest 16 unloads the guest items 20.

The autonomous vehicle locker 18 may also include a user input (e.g., user input system, user input assembly, user input mechanism) 49. The user input 49, such as a keypad, push buttons, microphone, camera (e.g., for use with gesture detection), and/or touchscreen, enable the guests 16 to interact with the lockers 18. For example, a guest 16 may use a touchscreen to select custom features for the assigned locker 18. In another example, a guest 16 may use a keypad to enter a passcode to unlock the locker 18. Additionally, user input 49 may be used by the guest 16 to select a location and a time for a meeting with the locker 18. As mentioned, autonomous vehicle lockers 18 may also include one or more displays 36 and one or more speakers 50 for exhibiting various custom features such as custom colors, sounds, lights, gestures, etc.

The autonomous vehicle locker 18 may include a lock control 51 that receives instructions from the controller 41 and/or the controller 56 and, based on the instructions, operates to lock or unlock a locking system 52 (e.g., locking assembly, locking mechanism, locking device) of an individual storage compartment 22. The instructions may be triggered by recognition of the assigned guest 16 and/or by received communication from the mobile device 58 or guest wearable device 66. For example, in an embodiment, the guest 16 may have a mobile device 58 that includes one or more processors 60 and memory 62 as well as a display 63 and communication circuitry 64. The mobile device 58 may communicate directly with the locker 18 to control (e.g., instruct) locking and/or unlocking of the locking system 52. In another example, the guest 16 may interact with a software application operating on the mobile device 58 via the controller 56 to trigger (e.g., instruct) locking and/or unlocking of the locking system.

In an embodiment, the guest 16 may have a wearable device 66 (e.g., bracelet, lanyard), or other device that includes communication circuitry 67 capable of communicating identification information of the guest 16 to autonomous vehicle locker 18. When the identification information is indicative of the assigned guest 16, the lock control 51 may operate (e.g., instruct) to unlock the locking system 52.

In an embodiment, the unlocking is based on guest recognition and a proximity determination. For example, the identified guest may be determined to be within a predetermined distance of the locker 18. The proximity determination may be generated via data from the sensor(s) 34. In this manner, the unlocking is triggered when the guest 16 is within a sufficient distance to retrieve their items from the locker 18 upon unlocking.

The system 40 can permit communication (e.g., wireless communication) between individual lockers 18 of a fleet and/or with a central controller 56 that can receive guest requests for a locker, store guest locker assignments, and/or track locker and/or guest locations. The central controller 56 may include a processor 53, memory 54, and communication circuitry 55 that may be implemented as generally discussed in the context of the locker 18. In an embodiment, the controller 56 may operate to execute certain locker control functions as provided herein. The system 40 may also receive inputs from guest devices and/or operator devices, such as mobile devices 58. Further, the system 40 may also include inputs from environmental sensors 57 (e.g., cameras, wireless beacons, RFID scanners), which may be used by the system 40 to track guests 16 and/or lockers 18.

Figure 5:
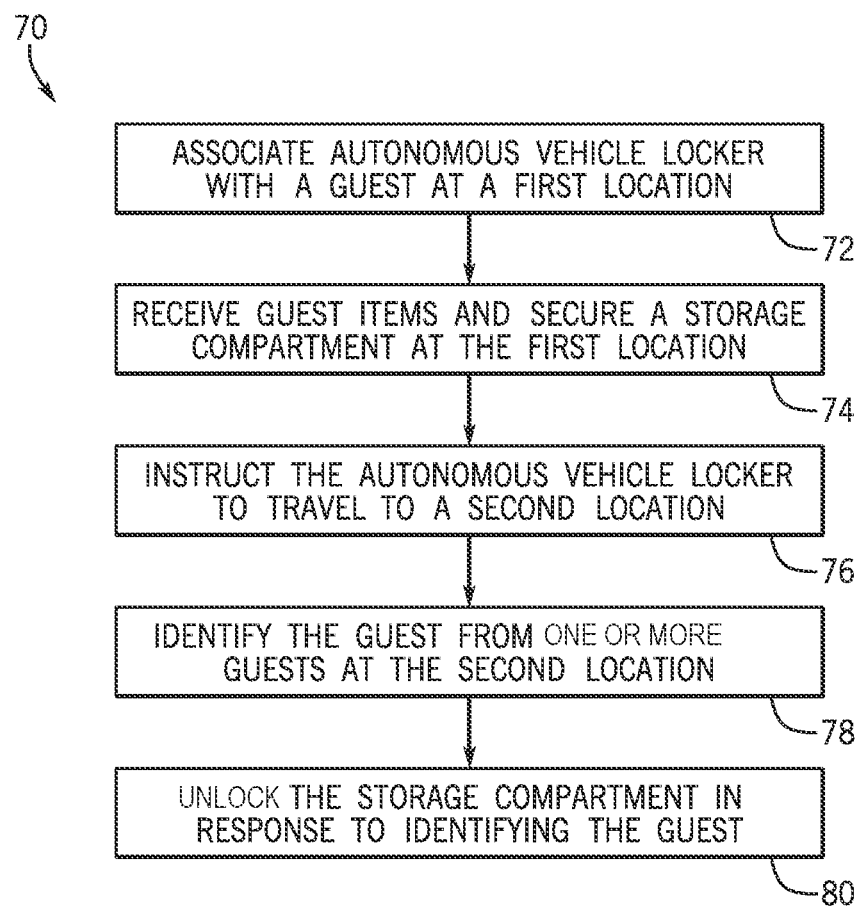
FIG. 5 is a flow diagram of a process of storing guest items in the autonomous vehicle locker and delivering the guest items for retrieval in a new location, in accordance with an aspect of the present disclosure.

FIG. 5 is a flow diagram of a process 70 of storing guest items 20 in an autonomous vehicle locker 18 and delivering the guest items 20 for retrieval in a new location, in accordance with an aspect of the present disclosure.

The process 70 begins with the autonomous vehicle locker 18 being associated with (e.g., assigned to) a guest 16 at a first location (block 72). The first location may include the location where the guest 16 comes into initial contact with the locker 18 and where the guest 16 loads guest items 20 into the locker 18. Association with a guest 16 may involve the locker 18 collecting guest data by performing a biometric measurement (e.g., biometric scan, measurement of fingerprint pattern, retinal pattern, iris pattern, facial image), scanning of a guest's RFID key fob, wearable device (e.g., armband) or guest pass 24, and/or taking a photo of the guest 16. This guest data may be used to identify the associated guest 16 (e.g., guest 16 associated with the locker 18) and lock and/or unlock the storage compartment 22 for the guest 16. For example, the autonomous vehicle locker 18 may identify the associated guest 16 based on a photo of the associated guest 16 using facial recognition (e.g., a facial recognition machine learning algorithm). In addition, association with a guest 16 may involve the locker 18 identifying and/or accessing a guest profile (e.g., using a guest photo, RFID signature, biometric data, pairing to guest mobile device via Wi-Fi or Bluetooth) to determine the preferences of the guest 16 that may be saved in the guest profile. For example, by accessing a guest profile the locker 18 may determine the custom features selected by the guest 16. Alternatively, association with a guest 16 may involve receiving guest input through a user input 49. For example, the guest 16 may enter the bar code number of the guest pass 24 and/or a password to initiate association with the locker 18.

Once the locker 18 has been assigned to the guest 16, the locker 18 may receive guest items 20 and/or secure storage compartment 22 at the first location (block 74). Guest items 20 received may include phones, wallets, purses as well as any items purchased and/or acquired by the guest 16 in the amusement park such as prizes, souvenirs, food, etc.

Once the guest items 20 have been stowed, the locker 18 is instructed to travel to a second location (block 76). The second location may include the location where the guest 16 will unload the guest items 20 from the locker 18. In one embodiment, the instruction to travel to a second location may be pre-set within the controller 41 of the locker 18. For example, a locker 18 that stores items of guests 16 attending a particular amusement attraction 14 may contain pre-set instructions to travel to the exit of the amusement attraction 14 (e.g., the second location) after picking up the guest items 20 near the entrance (e.g., the first location) of the amusement attraction 14. In an embodiment, the guest 16 may select the second location. For example, the guest 16 may use an application on a mobile device (e.g., a mobile device paired over Wi-Fi or Bluetooth with the locker 18) to select a GPS position of the second location within the amusement park. In addition, the guest 16 may use user input 49 of the locker 18 to select the second location. For example, a locker 18 may use a touch-screen display to display a map of the amusement park, which enables the guest 16 to select the second location on the map.

Once the locker 18 has traveled to the second location, the locker 18 identifies the guest 16 from one or more guests 16 at the second location (block 78). Identifying the guest 16 may involve identifying the location of the guest 16 in an area with one or more guests 16. In an embodiment, the guest 16 is identified from a plurality of guests 16. In one embodiment, the locker 18 may identify the location of the guest 16 based on location tracking of an armband/key fob of the guest 16. A locker 18 may form a mesh network of lockers 18 to identify the guest location based on image and location data sent from other lockers 18, as explained in FIG. 7. In addition, a guest 16 may send their location (e.g., a guest location) to the locker 18 by scanning a guest pass 24 on a pass scanner 26. Second, after approaching the guest 16, the locker 18 may confirm the identity of the guest 16 using a biometric measurement, facial recognition, an RFID scan of the guest's armband or key fob, etc. In response to thus identifying the guest 16, the locker 18 may unlock the storage compartment 22 (block 80). In certain embodiments, the storage compartment may mechanically open (e.g., spring open) in response to unlocking. The guest 16 may then retrieve the guest items 20.

Figure 6:
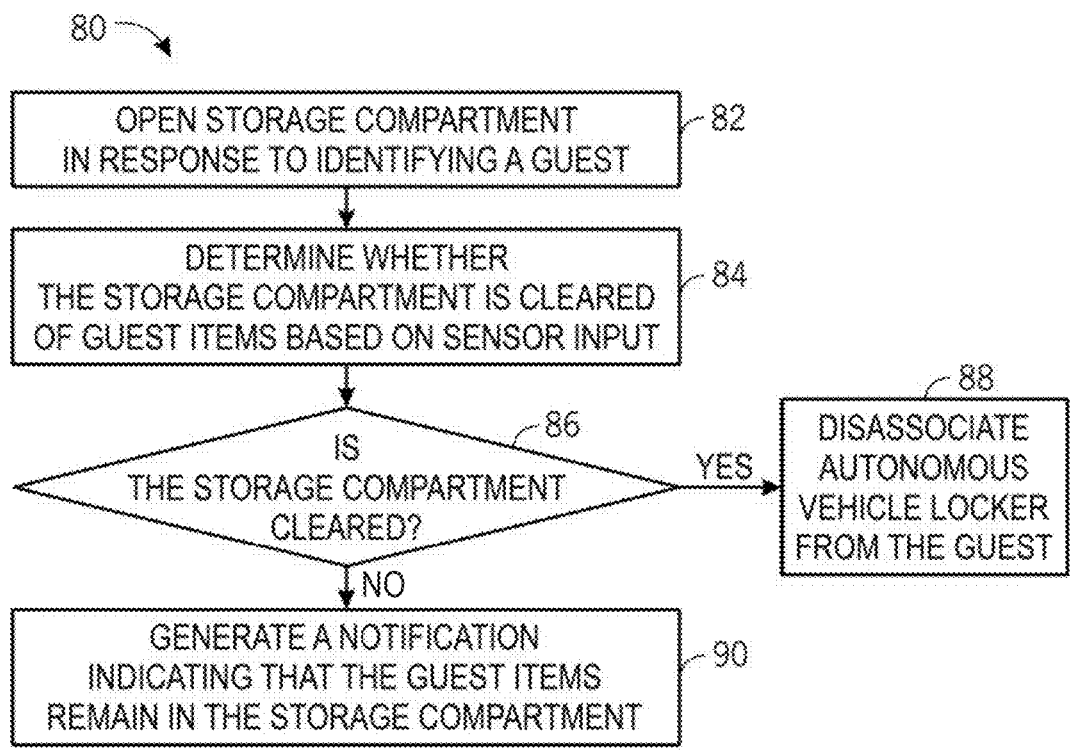
FIG. 6 is a flow diagram of a process of clearing guest items from an autonomous vehicle locker, in accordance with an aspect of the present disclosure.

FIG. 6 is a flow diagram of a process 80 of clearing guest items 20 from an autonomous vehicle locker 18, in accordance with an aspect of the present disclosure. The process 80 begins with unlocking a storage compartment 22 in response to identifying a guest 16 (block 82). After the storage compartment 22 has been unlocked, the guest 16 may then retrieve the guest items 20 (e.g., after stowing them in the locker 18 for the duration of an amusement attraction).

Next, the locker 18 may determine (e.g., make a determination) whether the storage compartment 22 is cleared based on sensor input (block 84). The determination may be initiated based on input from a light/movement sensor. For example, such a sensor may detect movement in the storage compartment 22 indicating that the guest 16 has reached into the storage compartment 22 to retrieve guest items 20. Based on the indication, a weight scale may determine, based on the weight of the storage compartment 22, whether there are any items remaining in the storage compartment 22. Other types of sensors may also be used to determine if the storage compartment 22 is clear (e.g., empty of guest items (e.g., guest belongings), completely empty). For example, a camera may take a photo of the storage compartment 22 after the scale indicated that the compartment is clear. Then, an image recognition algorithm may be used to determine if any light-weight items, such as a guest pass 24, remain in the storage compartment 22 based on the photo.

If the storage compartment 22 is cleared (block 86), the locker 18 may be dissociated from the guest 16 (block 88). If the storage compartment 22 is not cleared (block 86), the locker 18 may generate a notification indicating that the items remain in the storage compartment 22 (block 90). For example, the locker 18 may emit a verbal reminder, via a speaker 50, for the guest 16 to unload guest items 20. The locker 18 may display the reminder in a written form via a display 36. Additionally or alternatively, the storage compartment 22 and/or the locker 18 may flash red lights or a notification may be sent to the mobile device of the guest 16 indicating that the storage compartment 22 has not been cleared. The notification may, additionally or alternatively, be communicated to the controller 56 and/or communicated to a device of an operator.

Figure 7:
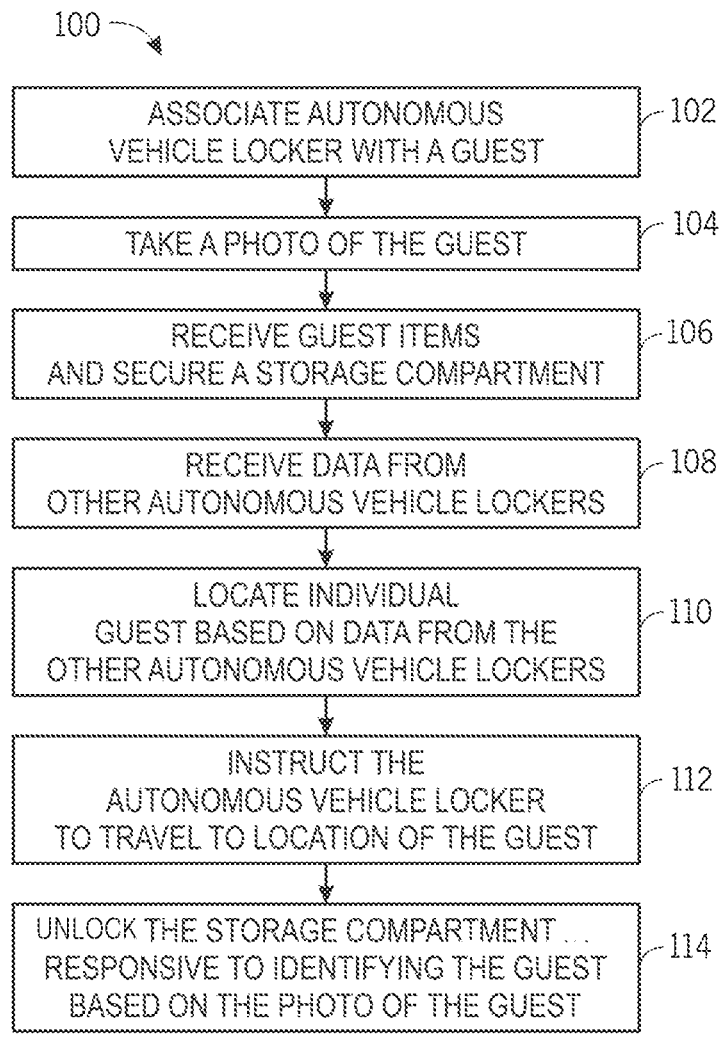
FIG. 7 is a flow diagram of a method of storing guest items in an autonomous vehicle locker and delivering the guest items to a location of the guest for retrieval based on a photo of the guest, in accordance with an aspect of the present disclosure.

FIG. 7 is a flow diagram of a process of storing guest items 20 in an autonomous vehicle locker 18 and delivering the guest items 20 to a location of the guest 16 for retrieval based on a photo of the guest 16, in accordance with an aspect of the present disclosure. The process 100 begins with associating the autonomous vehicle locker 18 with a guest 16 (block 102) as explained in the specification for FIG. 5. After the locker 18 has been associated with the guest 16, the locker 18 may take a photo of the guest 16 (block 104). In an embodiment, the photo may be a full-length photo of the guest 16 capturing the guest's overall appearance. The photo may then be sent (e.g., via Wi-Fi, Bluetooth, cellular communication) to other lockers 18 in a mesh network of lockers. The mesh network of lockers is a group of lockers 18 that shares data with one another. For example, the mesh network of lockers may include a locker fleet dedicated to guests 16 riding a particular amusement attraction 14. In addition to taking a photo of the guest 16, after association with the guest 16, the autonomous vehicle locker 18 may receive guest items 20 and secure (e.g., lock) storage compartment 22 (block 106).

The locker 18 may receive data from other lockers 18 (e.g., lockers 18 in the mesh network of lockers) (block 108). The data may include the photos of other guests 16, respective locations of other guests 16, and timestamps of when the photos and/or locations were collected. In an additional or an alternative embodiment, the data may include facial recognition data (e.g., guest identities). The locker 18 may only receive data from the other lockers 18 that are within a threshold distance from the locker 18. However, each locker 18 in the mesh network may share data aggregated from a plurality of other lockers 18. Thus, even though the locker 18 may not be within the signal range of some other lockers 18, it may receive data collected by all the lockers 18 in the mesh network.

Based on the data received from other lockers 18, the locker 18 may locate the guest 16 (e.g., the guest 16 the locker 18 is associated with) (block 110). The locker 18, via the controller 41, may compare the photo of the guest 16 to the data from other lockers 18 to identify, within the data from other lockers 18, data about the guest 16 associated with the locker 18. Based on the identified data, the locker 18 may track the guest 16 and identify the guest's current location within the amusement park.

After the current location of the guest 16 has been identified, the locker 18 may be instructed, via the controller 41, to travel to the location of the guest 16 (block 112). The guest 16 may be moving (e.g., walking) within the amusement park. Therefore, in an embodiment, the locker 18 may continuously update the identified current location of the guest 16 based on the data received from other lockers 18.

Once the locker 18 arrives at the location of the guest 16, the locker 18 may unlock storage compartment 22 in response to identifying the guest 16 based on the photo of the guest 16 (block 114). Once the locker 18 is within a threshold distance range of the guest 16, the locker 18 may take a photo of the guest 16 to confirm the guest's identity. For example, the newly taken photo may be compared with the originally taken photo to confirm that the features of the guest 16 (e.g., appearance, clothes, hair color, height) match. In another example, a facial recognition machine learning algorithm may determine whether the newly taken images of the guest 16 match the originally taken images of the guest 16. In an embodiment, additional authentication methods, such as biometric authentication, may be used to confirm the identity of the guest 16 and to unlock the storage compartment 22.

Figure 8:
FIG. 8 is an example user interface of the autonomous vehicle locker, in accordance with an aspect of the present disclosure.
Figure 9:
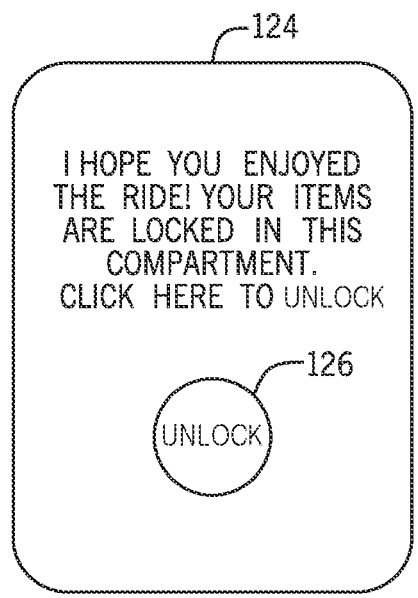
FIG. 9 is an example user interface of the autonomous vehicle locker, in accordance with an aspect of the present disclosure.

FIGS. 8-9 show example user interfaces of the autonomous vehicle locker 18. In FIG. 8, a user interface screen 120 shows an example message for the guest 16 that includes a lock icon 122 provided that, when contacted, generates instructions to the locking system 52 for locking the locking system 52. In FIG. 9, a user interface screen 124 shows an example message for the guest 16 that includes an unlock or open icon 126 provided that, when contacted, generates instructions provided to the locking system 52 for unlocking the locking system 52. The unlocking may be part of a two-step verification whereby the system 40 first identifies the correct guest 16 as being in proximity to the locker 18 and, once identified, permits unlocking based on receiving the appropriate selection of the user input (e.g. the unlock key 126).

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An autonomous vehicle locker comprising:
   a storage compartment;
   a camera;
   a controller comprising a memory storing instructions, and a processor configured to execute the instructions, the instructions configured to cause the controller to:
      associate the autonomous vehicle locker with a guest at a first location using an image of the guest captured by the camera;
      receive an indication that guest items are within the storage compartment;
      instruct the storage compartment to lock based on the indication;
      instruct the autonomous vehicle locker to travel to a second location associated with an exit of an attraction;
      instruct the camera to capture images of guests exiting the attraction at the second location;
      transmit the images to a central controller;
      receive a position of the guest at the second location from the central controller, wherein the position is based on other images from other autonomous vehicle lockers at the second location;
      autonomously drive to the position;
      confirm an identity of the guest at the position at the second location using the image; and
      instruct the autonomous vehicle locker to unlock the storage compartment in response to identifying the guest.

2. The autonomous vehicle locker of claim 1, wherein the instructions configured to cause the controller to associate the autonomous vehicle locker with the guest further comprise instructions to:
   receive biometric data of the guest;
   read an RFID tag associated with the guest using a reader; or
   receive guest pass data of the guest from a pass scanner.

3. The autonomous vehicle locker of claim 1, wherein the instructions configured to cause the controller to identify the guest from a plurality of guests at the second location further comprise instructions to:
   take a second photo of the guest using the camera;
   receive biometric data of the guest;
   scan an RFID tag associated with the guest using a reader; or
   receive guest pass data of the guest from a pass scanner.

4. The autonomous vehicle locker of claim 1, wherein the instructions configured to cause the controller to identify the guest from a plurality of guests at the second location further comprise tracking the guest via:
   a tracking device on the guest; or
   environmental sensors in an amusement park.

5. The autonomous vehicle locker of claim 1 comprising a sensor configured to sense obstacles in a path of the autonomous vehicle locker, wherein the sensor comprises a LIDAR sensor.

6. The autonomous vehicle locker of claim 1, wherein the autonomous vehicle locker is configured to exhibit, via a display, a speaker, or a combination thereof, custom features based on a user input by the guest, wherein the custom features comprise:
   custom colors on the display;
   lights on the display; or
   sounds from the speaker.

7. The autonomous vehicle locker of claim 1 wherein the storage compartment comprises a removable module configured to be utilized by more than one autonomous vehicle locker.

8. The autonomous vehicle locker of claim 1, wherein the instructions configured to cause the controller to associate the autonomous vehicle locker with a guest cause the controller to access a guest profile of the guest.

9. The autonomous vehicle locker of claim 8, wherein the instructions are configured to cause the controller to:
   assign points associated with the guest profile based on the guest finding the autonomous vehicle locker.

10. The autonomous vehicle locker of claim 1, wherein the instructions are configured to cause the controller to:
    receive a sensor input from a sensor of the autonomous vehicle locker after the guest has been identified, wherein the sensor input is indicative of a presence or absence of the guest items in the storage compartment;
    make a determination that the storage compartment is cleared of the guest items based on the sensor input; and
    prompt the autonomous vehicle locker to be dissociated from the guest.

11. An autonomous vehicle locker system comprising:
    a storage compartment;
    a camera;
    a controller comprising:
       a memory storing instructions; and
       a processor configured to execute the instructions, wherein the instructions cause the controller to:
       receive an indication of association of an autonomous vehicle locker with a guest;
       cause the autonomous vehicle locker to travel to a holding area after receiving guest items;
       track a guest location in the holding area based on receiving an indication of the guest location from a different autonomous vehicle locker in a fleet comprising the autonomous vehicle locker;
       receive a request to receive the guest items from the autonomous vehicle locker;
       cause the autonomous vehicle locker to travel to the tracked guest location based on the request; and
       unlock the storage compartment in response to identifying the guest at the tracked guest location.

12. The system of claim 11, wherein the request is received from a mobile device.

13. The system of claim 11, wherein the different autonomous vehicle locker in the fleet generates the indication by:
activating a camera of the different autonomous vehicle locker to capture images of guests in range of the camera in the holding area and
identifying the guest in the images and
cause the autonomous vehicle locker to travel to the tracked location responsive to the identifying.

14. The system of claim 13, wherein the instructions comprise:
accessing a plurality of stored images to identify the guest.

15. The system of claim 13, wherein the instructions comprise using facial recognition to identify the guest.

16. An autonomous vehicle locker method comprising:
associating, using a controller, an autonomous vehicle locker with a guest at a first area of an attraction;
acquiring an image of the guest with a camera of the autonomous vehicle locker;
receiving guest items in a storage compartment of the autonomous vehicle locker;
receiving data from one or more other autonomous vehicle lockers at a second area of the attraction;
locating the guest at a location in the second area of the attraction based on the data from the other autonomous vehicle lockers;
instructing the autonomous vehicle locker to travel to the location of the guest based on the locating;
acquiring an updated image at the location;
identifying the guest in the updated image; and
unlocking the storage compartment in response to identifying the guest.

17. The method of claim 16, comprising receiving a user input and activating one or more display features of the autonomous vehicle locker, one or more audio features of the autonomous vehicle locker, or a combination thereof based on the user input.

18. The method of claim 16, comprising activating one or more display features of the autonomous vehicle locker, one or more audio features of the autonomous vehicle locker, or a combination thereof in response to identifying the guest.

19. The method of claim 16, wherein associating the autonomous vehicle locker with the guest comprises scanning a guest code using a scanner of the autonomous vehicle locker.

20. The method of claim 16, wherein the data comprises image data from one or more cameras of the one or more other autonomous vehicle lockers, wherein the autonomous vehicle locker and the one or more other autonomous vehicle lockers are part of a fleet.

\* \* \* \* \*